(12) United States Patent
Garbald et al.

(10) Patent No.: US 11,432,462 B2
(45) Date of Patent: Sep. 6, 2022

(54) CROP HARVESTING MACHINE WITH VARIABLE HEADER FLOAT

(71) Applicant: MacDon Industries Ltd., Winnipeg (CA)

(72) Inventors: Jann Peter Garbald, Winnipeg (CA); James Thomas Dunn, Winnipeg (CA); Graham Michael Leverick, Cambridge, MA (US); Russell George Lyons, Winnipeg (CA); Bruce Robert Shearer, Winnipeg (CA); Neil Gordon Barnett, Winnipeg (CA)

(73) Assignee: MacDon Industries LTD, Winnipeg (CA)

( * ) Notice: Subject to any disclaimer, the term of this patent is extended or adjusted under 35 U.S.C. 154(b) by 575 days.

(21) Appl. No.: 15/747,859

(22) PCT Filed: Jun. 19, 2017

(86) PCT No.: PCT/CA2017/050748
§ 371 (c)(1),
(2) Date: Jan. 26, 2018

(87) PCT Pub. No.: WO2017/219130
PCT Pub. Date: Dec. 28, 2017

(65) Prior Publication Data
US 2020/0077585 A1    Mar. 12, 2020

Related U.S. Application Data

(63) Continuation-in-part of application No. 15/188,468, filed on Jun. 21, 2016, now Pat. No. 9,968,033.

(51) Int. Cl.
*A01D 41/14* (2006.01)
*A01B 63/00* (2006.01)
(Continued)

(52) U.S. Cl.
CPC .......... *A01D 41/145* (2013.01); *A01B 63/008* (2013.01); *A01B 63/108* (2013.01); *A01D 41/127* (2013.01); *A01D 41/141* (2013.01)

(58) Field of Classification Search
CPC .... A01D 41/145; A01D 41/127; A01D 41/41; A01D 33/14; A01D 34/00; A01D 34/001;
(Continued)

(56) References Cited

U.S. PATENT DOCUMENTS 5,455,769 A * 10/1995 Panoushek ........... A01D 41/145
56/208
5,463,854 A * 11/1995 Chmielewski, Jr .. A01D 41/141
56/10.2 E
(Continued)

FOREIGN PATENT DOCUMENTS

EP         2420126 A1 *  2/2012  ........... A01D 41/141

*Primary Examiner* — Adam J Behrens
(74) *Attorney, Agent, or Firm* — Miller Canfield

(57) ABSTRACT

In a crop harvesting machine there is provided a pair of hydraulic float cylinders or springs for a header such as a rotary mower relative to a self-propelled vehicle, where a float spring force is controlled to provide a predetermined lifting force is provided to the header. The spring force is varied in response to detection of ground speed to decrease the lifting force at higher ground speeds. A position sensor is used to generate an indication of movement and/or acceleration. The electronic control is arranged, in response to changes in the sensor signal, to temporarily change the control signal to vary the lifting force and thus change the dynamic response of the hydraulic float cylinder. In order to reduce static friction so that the system can react quickly, an arrangement is provided for causing relative reciprocating movement in an alternating wave pattern between the piston and cylinder.

19 Claims, 6 Drawing Sheets

(51) Int. Cl.
*A01D 41/127* (2006.01)
*A01B 63/108* (2006.01)

(58) Field of Classification Search
CPC .... A01D 34/006; A01D 34/008; A01D 34/24; A01D 34/246; A01D 34/28; A01D 34/664; A01B 63/008; A01B 63/108; A01B 63/045; A01B 63/1145
See application file for complete search history.

(56) References Cited

U.S. PATENT DOCUMENTS

| | | | |
|---|---|---|---|
| 5,704,200 A * | 1/1998 | Chmielewski, Jr | A01D 41/141 56/10.2 E |
| 7,552,577 B2 * | 6/2009 | Strasser | A01D 41/141 56/10.2 R |
| 8,051,632 B2 * | 11/2011 | Strasser | A01D 41/141 56/10.2 R |
| 8,333,057 B2 * | 12/2012 | Schroeder | A01D 41/141 56/10.2 E |
| 8,560,182 B2 * | 10/2013 | Ringwald | A01D 41/141 701/50 |
| 2006/0248868 A1 * | 11/2006 | Otto | A01D 41/145 56/10.2 E |
| 2007/0068129 A1 * | 3/2007 | Strasser | A01D 41/141 56/10.2 E |
| 2009/0235626 A1 * | 9/2009 | Fackler | A01D 41/145 56/10.2 E |
| 2010/0281837 A1 * | 11/2010 | Talbot | A01D 41/141 56/10.2 E |
| 2012/0174549 A1 * | 7/2012 | Schroeder | A01D 41/141 56/10.2 E |
| 2019/0327893 A1 * | 10/2019 | Hamilton | A01D 78/001 |

* cited by examiner

CROP HARVESTING MACHINE WITH VARIABLE HEADER FLOAT

This invention relates to crop harvesting machine with a variable header float weight.

SUMMARY OF THE INVENTION

According to a first aspect of the invention there is provided a crop harvesting machine comprising:

a self-propelled support vehicle for running over ground carrying a crop to be harvested;

a crop cutting header including at least one ground engaging component for providing a supporting force from the ground;

a support apparatus providing a lifting force for supporting the header from the vehicle for upward and downward floating movement of the header;

a control system arranged to provide a value of said lifting force so that a predetermined proportion of a supporting force is supplied by the support apparatus and a remaining portion is supplied by said at least one ground engaging component in engagement with the ground;

said control system being arranged in response to a ground speed signal to temporarily change the lifting force.

Preferably the crop cutting header comprises a rotary mower having a plurality of transversely spaced cutting disks. The variability of the header float based on ground speed is particularly applicable to the higher ground speeds of 5 to 15 mph obtainable with rotary mowers.

Preferably the control system is arranged such that the lifting force is reduced to increase the weight of the header on the ground when the ground speed is higher.

Preferably the control system is arranged such that the lifting force is reduced to increase the weight of the header on the ground when the ground speed is greater than 5 mph.

In one arrangement the control system is arranged such that the lifting force is reduced to increase the weight of the header on the ground proportional to ground speed. That is for example the lifting force may be directly proportional to ground speed. However other algorithms can be used to increase the weight such that the lifting force is reduced to increase the weight of the header on the ground in response to an algorithm dependent on ground speed.

Preferably there is provided a ground speed sensor for providing an input to the control system.

Preferably the control system is arranged subsequently in response to reducing the lifting force to revert to a set value.

Preferably the control system is arranged to temporarily vary the lifting force in response to detected movement of the header relative to the vehicle.

Preferably the control system is arranged to temporarily vary the lifting force in response to detected acceleration of the header relative to the vehicle.

Preferably the electronic control system is arranged upon detection of an end of said acceleration to vary the lifting force.

Preferably there is provided a position sensor for generating a position signal indicative of a position of the header in said movement and the control system is arranged to calculate from the position signal a velocity and acceleration of the header.

Preferably the control system is arranged to provide a plurality of preset flotation weights for different ground speeds.

In one preferred arrangement as describe hereinafter, the support apparatus comprises a mechanical spring and the control system is arranged to vary a spring force of the mechanical spring.

In another arrangement, the support apparatus including at least one hydraulic float cylinder arranged such that application of a hydraulic fluid under hydraulic pressure to said at least one float cylinder causes a lifting force to be applied to the crop engaging assembly by movement of said at least one float cylinder which lifting force is proportional to said hydraulic pressure.

In this arrangement there is provided a source of hydraulic fluid for supply of the hydraulic fluid to said at least one float cylinder at a pressure greater than said hydraulic pressure and a return for the hydraulic fluid.

A valve arrangement is provided for controlling a flow of and pressure of said hydraulic fluid from said source to said at least one float cylinder, the valve arrangement being connected to said at least one float cylinder such flow of fluid into and out of said at least one float cylinder is controlled by the valve arrangement at said hydraulic pressure controlled by the valve arrangement and including an electronic control system for supplying a control signal to the valve arrangement to change said predetermined pressure in dependence on a value of the signal.

The valve arrangement comprises a first connection to said source, a second connection to said at least one float cylinder, a third connection for discharge of said hydraulic fluid to said return and a valve operating system operable to control flow of hydraulic fluid from said source to said at least one float cylinder and flow of hydraulic fluid from said at least one float cylinder to said return so as to maintain said hydraulic pressure in said at least one float cylinder at a predetermined pressure set in dependence upon said control signal from said control system.

A sensor is arranged to provide a sensor signal to said electronic control system in response to movement of the crop engaging assembly in said upward and downward floating movement of the crop engaging assembly, the electronic control system is arranged to provide a set value of said control signal to provide said lifting force at a set value to maintain said predetermined proportion of said supporting force and the electronic control system is arranged in response to said sensor signal to temporarily change the control signal to temporarily change the lifting force.

Preferably the electronic control system is arranged subsequent to the temporary change, in response to said sensor signal, to revert to the set value. In this way, preferably, the electronic control system is arranged in response to changes in said sensor signal to temporarily change the control signal to vary the lifting force and thus change the response of the hydraulic float cylinder in response to detected movement of the crop harvesting component.

For example the electronic control system is arranged upon detection of an end of the acceleration in said upward floating movement to change the control signal to decrease the lifting force to dampen the upward movement.

In this way the control system can be used to increase the lifting force dynamically during the time that the header is being lifted by contact with the ground or another obstacle so as to improve the response to forces from ground contact. In addition as soon as the ground contact is removed thus halting any further acceleration, the lifting force can be significantly reduced so that the weight of the header is re-applied in the downward direction thus damping any further upward floating movement. This avoids or reduces the situation where the header is lifted by ground force or engagement with an obstacle and then remains lifted for an extended period of time thus interfering with the cutting of the crop while the header remains raised.

It will be appreciated that the dynamic control of the lifting forces depending upon the movement of the header can be used both in a ground flotation mode and also when cutting at a set raised height. In the latter condition, float action is typically provided in order to float the header over any obstacles, even though the main cutting action is at the raised position from the ground. Also in some cases such as ditches and mounds the ground height may vary sufficiently that the header engages the ground even though nominally set at a height above the ground. In all of these cases, therefore, the dynamic control of the lifting forces increases the available force to lift the header over the change in height of the ground or over the obstacle. At the same time the lifting action is halted or reduced when the obstacle is cleared so as to reduce the time that the header remains elevated above the required condition.

In a situation where the header is at a raised cutting height, the downward forces can also be dynamically controlled to most effectively return the header to the required cutting height. Thus the downward forces may be increased at the beginning of the downward movement and may be reduced toward the end of the downward movement to bring the header more smoothly back to its required height.

In order to provide the best damping force, preferably the electronic control system is arranged to change the control signal to decrease the lifting force to a value less than said set value. The header will therefore accelerate downwardly in view of this reduced lifting force until the header reaches the ground whereupon the downward acceleration is halted and the control system reapplies the set value.

In a symmetrical manner, preferably the electronic control system is arranged upon detection of acceleration in the downward floating movement to change the control signal to decrease the lifting force to assist the acceleration in said downward floating movement. That is, when the header has been riding on the ground with no float required, and when a dip in the ground requires that the header fall to the lower ground level, the lifting force can be rapidly decreased so as to assist the downward movement of the header using the weight from the header. Also the electronic control system can be arranged upon detection of an end of said acceleration in said downward floating movement, that is the header has re-engaged with the ground, to change the control signal to increase the lifting force to dampen said downward movement.

Preferably the sensor comprises a position sensor for generating a position signal indicative of a position of the cylinder in its movement and the electronic control system is arranged to calculate from the position signal a velocity and acceleration of the crop harvesting component. However other sensor arrangements may be provided including for example a specific acceleration detection device and a specific relative movement detection device, all of which senses are now readily available in effective and inexpensive form due to their wide usage in other areas.

Preferably the electronic control system is therefore arranged to achieve a comprehensively adjustable spring rate for the dynamics of the flotation system.

Preferably the electronic control system is therefore arranged to achieve comprehensively adjustable damping for the dynamics of the flotation system.

In this invention, the electronic control system can be arranged to achieve comprehensively adjustable flotation system dynamics based on operating state of the implement including but not limited to implement height, ground speed and changes in terrain (incline angle, etc)

in additional preferably the electronic control system can be arranged to allow for the operator to select from preset flotation system dynamics which can be tailored to different field conditions and implements.

In order to take advantage of the benefits of a hydraulic flotation system, the arrangement herein provides a system that reduces the effect of the friction in the flotation system to provide excellent ground following capabilities. This system may be applied to windrowers and combine adapters or any other agricultural implement that is floating suspended from carrier (hay tools, rakes, pickups, etc). The system can be used when floating a header that is cutting on the ground as well as a header that is cutting at a height above ground level. While the system is particularly applicable to the main header float at the front of the tractor, the same construction can also be used for the wing float on a flex draper header of the type shown in U.S. Pat. No. 5,005,343 (Patterson) issued 9 Apr. 1991, the disclosure of which is incorporated herein by reference.

The system herein comprises one or more float cylinders that are used to suspend the header from the carrier. At (or near) each cylinder is an electronically controlled proportional pressure reducing relieving (PPRR) valve that controls the pressure at that cylinder. The valve is controlled by an electronic controller that takes pressure (or force) and position/velocity/acceleration feedback from the float system and varies the pressure in the cylinder to obtain prescribed float characteristics. A hydraulic pressure and flow is supplied to the valve from a source, that could be an accumulator charged to more than the maximum pressure demanded by the float system, a drive circuit that has a minimum pressure that is more than the maximum pressure demanded by the float system, or some other hydraulic source. However the pressure from the valve is applied directly and immediately to the cylinder without the presence of an accumulator in the circuit which would otherwise dampen the action of the pressure on the cylinder.

That is while most systems have an accumulator hydraulically connected directly to the cylinder in float mode, the present arrangement uses an electronically controlled PPRR valve directly between the pressure source and the float cylinder. This allows the system to have very precise, instantaneous control of the float cylinder pressure so that it can adjust the pressure based on instantaneous changes of the float system. The accumulator systems are far less precise/responsive since a change of hydraulic pressure, when commanded, is split between cylinder movement and accumulator charge).

Each float cylinder has a respective position sensor, pressure sensor and pressure reducing relieving valve. The valve is then coupled to a pressure source. The controller receives input from the sensors and controls each PPRR valve independently based on these input signals. The signal from the position sensor may be directly linked to the cylinder or may be linked to some other float link(s) that indicate header position. This signal can be used to calculate in the electronic control system velocity and acceleration of the header as well as header position in the float range. The PPRR valves directly control the cylinders with no accumulator between the valve and the cylinder. This is the simplest representation of the system.

In another improvement of the invention that adds an accumulator, pressure sensor and control valve to enhance the response of the float system. The controller receives an input signal from the pressure sensor and controls the valve to maintain a pressure range in the accumulator that is some value higher (200-250 psi for example) than the maximum pressure demanded at pressure sensors. This maximum pressure is dependent on header weight and can be determined via calibration using conventional methods where the lifting force is increased gradually until the header just lifts from the ground and by adding a predetermined value to that detected value, or by stored values based on header ID for each header size and type.

With this method, the accumulator can supply instantaneous flow to the PRR valves likely more quickly than the load sense pump can respond to the demand of flow.

Note that this type of float system may also be used to float the wings on a flex header. Using a cylinder to react the weight of the wing near the wing pivot and controlling that cylinder with the proposed system.

In addition to the above, the electronic control algorithms include a method of controlling the output to the proportional PRR valve controlling the cylinder pressure, to encourage the header to follow the ground more effectively.

Part of the electronic control that we use involves applying an oscillating control signal to the PPRR valve that supplies float pressure to the cylinder. This creates a varying pressure in the cylinder that causes the cylinder to oscillate slightly. In doing so, the cylinder is always in motion and this reduces the friction effect of the cylinder seals. This oscillation of the pressure also helps to compensate for the hysteresis or dead band of the proportional pressure reducing/relieving valve. This type of valve includes a spool oscillating back and forth between input and output fluid positions to maintain the pressure at a position determined by the signal to the solenoid of the valve where the position of the spool is controlled by a pilot connection to the output pressure line. Typically the pilot connection is internal to the valve itself and does not require a duct to the output line or to the controlled cylinder. This type of valve has a dead band between where it relieves pressure and where it reduces pressure.

A further feature of the system is that the system provides a programmable spring rate or float decay that can be customized to a variety of float requirements such as cutting height, ground speed, soil conditions etc. This spring rate can instantaneously and continually be adjusted based on sensor inputs from the float system, operator or other systems such as radar, sonar or laser detection of obstacles and ground contours.

A further feature of the system includes the ability to have adjustable dampening of the float system, again based on float requirements or situations.

Another feature involves the increase or decrease of float cylinder pressure based on float position and direction of movement. For example, this allows us to decrease the float pressure if the header is detected to be moving down (while cutting through a ditch for example) so that the header will follow the ground as the ground drops away. A similar adjustment can be made to increase the float pressure if the header is detected to be moving up over a mound.

Another feature involves the increase or decrease of float cylinder pressure based on header velocity and/or acceleration.

Other features of the invention provide:
—a—Oscillating float pressure to reduce effects of proportional PRR valve hysteresis as well as system (mechanical) and cylinder seal friction.
—b—Sensing change in float position/last travel direction/velocity (this can be done with sensors measuring cylinder length, float link position etc) and then decreasing/increasing float pressure to make the header fall faster or raise faster.
—c—Different float characteristic settings based on ground condition, ground speed, crop, cutting on/off the ground.
—d—Programmed spring rate.

Feedback from a pressure sensor may not necessarily be required as the system may be able to just use the output to the PWM valve. For example, the valve output pressure can be correlated to valve electronic input so technically, if we send the valve a known signal, we can know what output pressure the valve is set to. However typically the pressure sensor may be required due to changes in valve characteristics due to temperature changes, wear, vibration etc which may be too large to make this viable.

The signal from the pressure sensor can be used as a feed back to confirm that the valve is indeed outputting the required output pressure as set by the control signal. Thus it may be possible to provide an arrangement in which the feedback is used only periodically to check the output value so that the signal from the pressure sensor is not directly and repeatedly used by the control system. That is, periodically the output pressure can be checked and a correction factor used in subsequent calculations by the control system, if it is found that the measured output pressure does not match the intended value as set by the control device.

As an alternative, an arrangement can be made to work where the system knows the position of the header in the float range (from the position sensors) and can use this knowledge to make changes to the float pressure to find an optimum value that places the header with a minimal ground force based on velocity and acceleration calculations.

While the alternating wave movement is preferably provided by a wave form in the signal from the control device, it also possible to use an alternative method in which a mechanical version of dithering such as a piston/crank arrangement that oscillates the float pressure. For example in a sickle cutter the system could use the pulsing of the knife drive circuit as well.

Various methods of obtaining float supply pressure can be used including drive circuit pressure, drive circuit pressure with an accumulator and check valves, closed loop load sense pump.

Calibration is typically carried out by the conventional method in which the system is operated to increase float pressure until header just leaves the ground and then use the system to increase/decrease float pressure to get optimum ground contact pressure. Other calibration methods can of course be used, many of which are known to persons skilled in the art.

BRIEF DESCRIPTION OF THE DRAWINGS

Embodiments of the invention will now be described in conjunction with the accompanying drawings in which.

DETAILED DESCRIPTION

Figure 1:
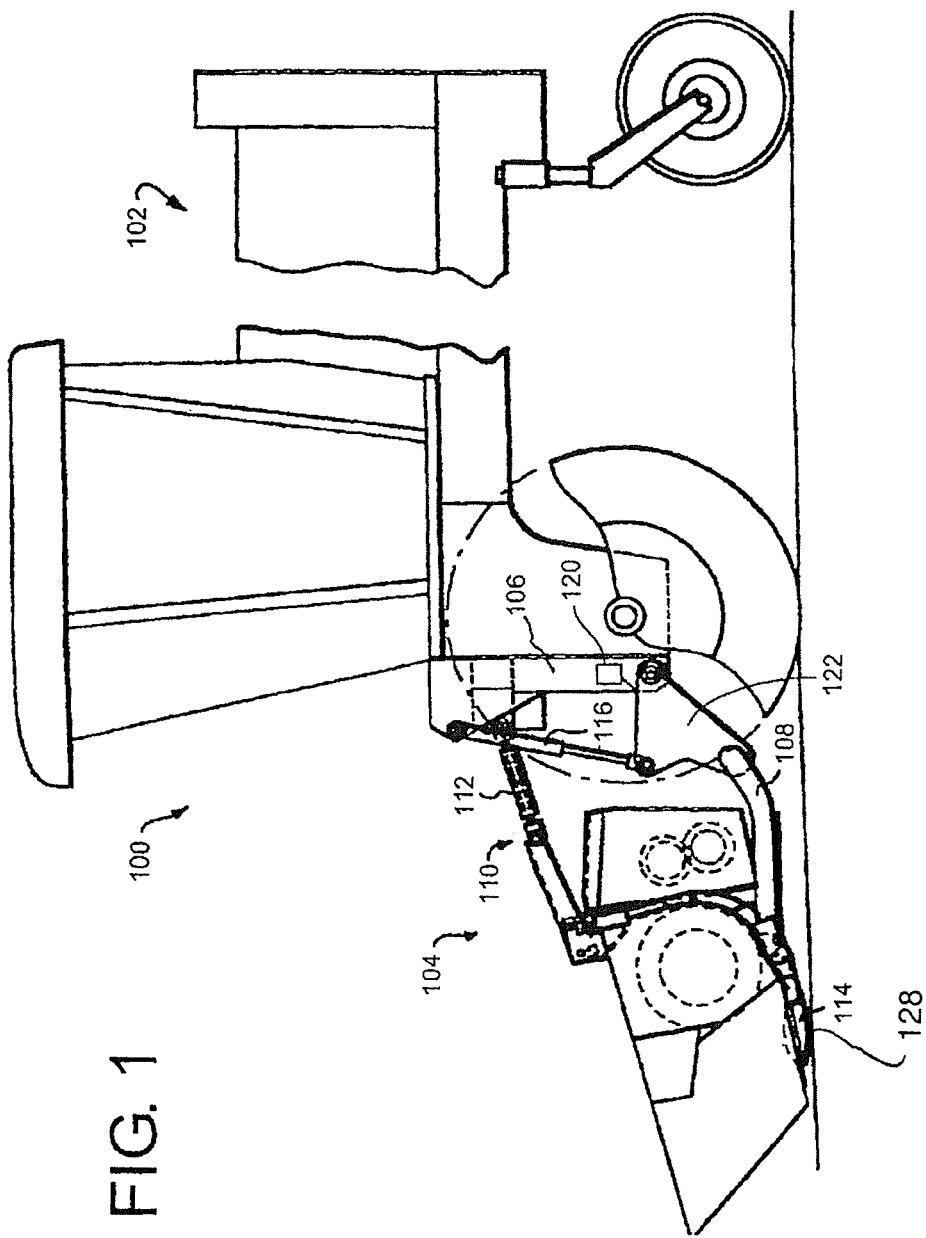
FIG. 1 is a side view of a vehicle having a header and a header flotation system in accordance with the present invention. In this embodiment, the vehicle is a windrower.

FIG. 1 shows the present invention utilized in connection with the self-propelled windrower 100, however, it will be appreciated that the principles of the present invention are not limited to a self-propelled wind rower, or to any specific type of harvesting machine having a header. The figure shows windrower 100, which comprises a tractor 102 and a header 104. The header 104 is pivotally attached to the front end of the frame or chassis 106 of windrower 100 such that it can move up and down with respect to chassis 106.

Such attachment of the header 104 to the frame 106 is achieved through a pair of lower arms 108 (only the left one being shown, the right one being in the same position and in mirror configuration on the right side of the vehicle) pivoted at one end to the frame 106 and at the other end to the header 104 as well as through a central upper link 110.

The link 110 may take the form of a single or double hydraulic cylinder 112 whose extension and retraction is controlled by the operator to remotely control the angle of the sickle bar 114 on the lower front of the header 104.

A single lift/flotation cylinder 116 is shown interconnecting the lower arm 108 to the frame 106. Cylinder 116 supports each side of the header, i.e., each side of the header is supported by its own lift/flotation cylinder 116. Again, only the left side lift/flotation cylinder 116 is shown. The right side lift/flotation cylinder 118 is identically constructed, configured, and arranged as left side lift/flotation cylinder 116 and is interconnected in the identical manner to the header and the frame but is configured in mirror image form to that of the left side of the vehicle.

A position sensor 120 is coupled to and between frame 106 and bell crank 122 and is configured to sense the position of the cylinder. This can be done at the cylinder or at another location such as at the relative position of bell crank 122 with respect to frame 106. The position sensor shown here is a potentiometer providing a signal which varies when the header moves up and down (has a vertical component of translation) with respect to frame 106. In this sense, the position sensor is also a height sensor which detects the height of the header from the tractor. The particular arrangement of position sensor 120 with respect to frame 106 and with respect to bell crank 122 can be varied depending on the space available, the type transducer desired, and the resolution of the sensor.

The arrangement therefore provides a crop machine, typically a crop harvesting machine, comprising the support vehicle 102 for running over ground to be harvested and a crop component, typically a harvesting header 104, including a crop engaging system 114 and at least one ground engaging component or skid plate 128 for providing a supporting force from the ground. The support apparatus 110, 106, 116 and 108 acts to support the crop harvesting header from the vehicle for upward and downward floating movement of the crop harvesting header so that a part of a supporting force is supplied by the support apparatus and a part supplied by the ground engaging component 128.

Figure 6:
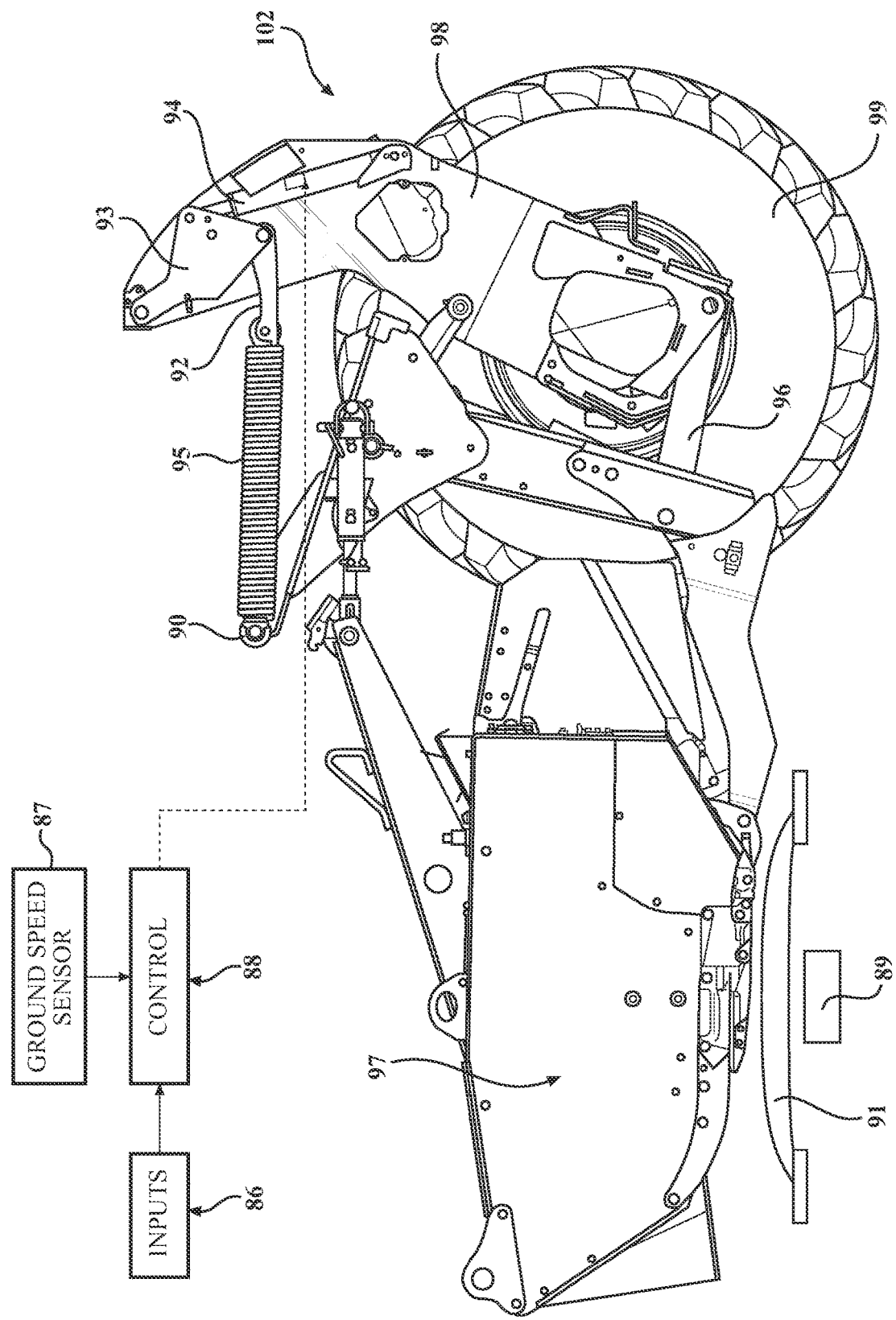
FIG. 6 is a cross-sectional view through a vehicle of the type shown in FIG. 1 where the header is a rotary mower including cutting disks and the support apparatus carrying the header from the vehicle comprises a float spring.

In FIG. 6, the vehicle 102 includes front ground wheels 99 each of which carries an upstanding header support arm 98 which carries a rotary header 97. The rotary header is of a conventional construction including a series of rotary disks 91 carried on a cutter bar 89. The header can float upwardly and downwardly on links 96 controlled by a float spring 95. The effective spring force of the spring is varied by a cylinder 94 which acts to pivot a link 93 to move one end 92 of the spring 95. The other end 90 of the spring is connected to the header to apply a lifting force to the header. The link 93 when actuated by the cylinder acts to change either the length of the spring 95 or the mechanical advantage of the spring or both so as to vary the effective spring force applied by the spring to change the lifting force on the header. As the lifting force is reduced, the weight of the header on the ground typically applied through the cutter bar 89 increases.

Figure 2:
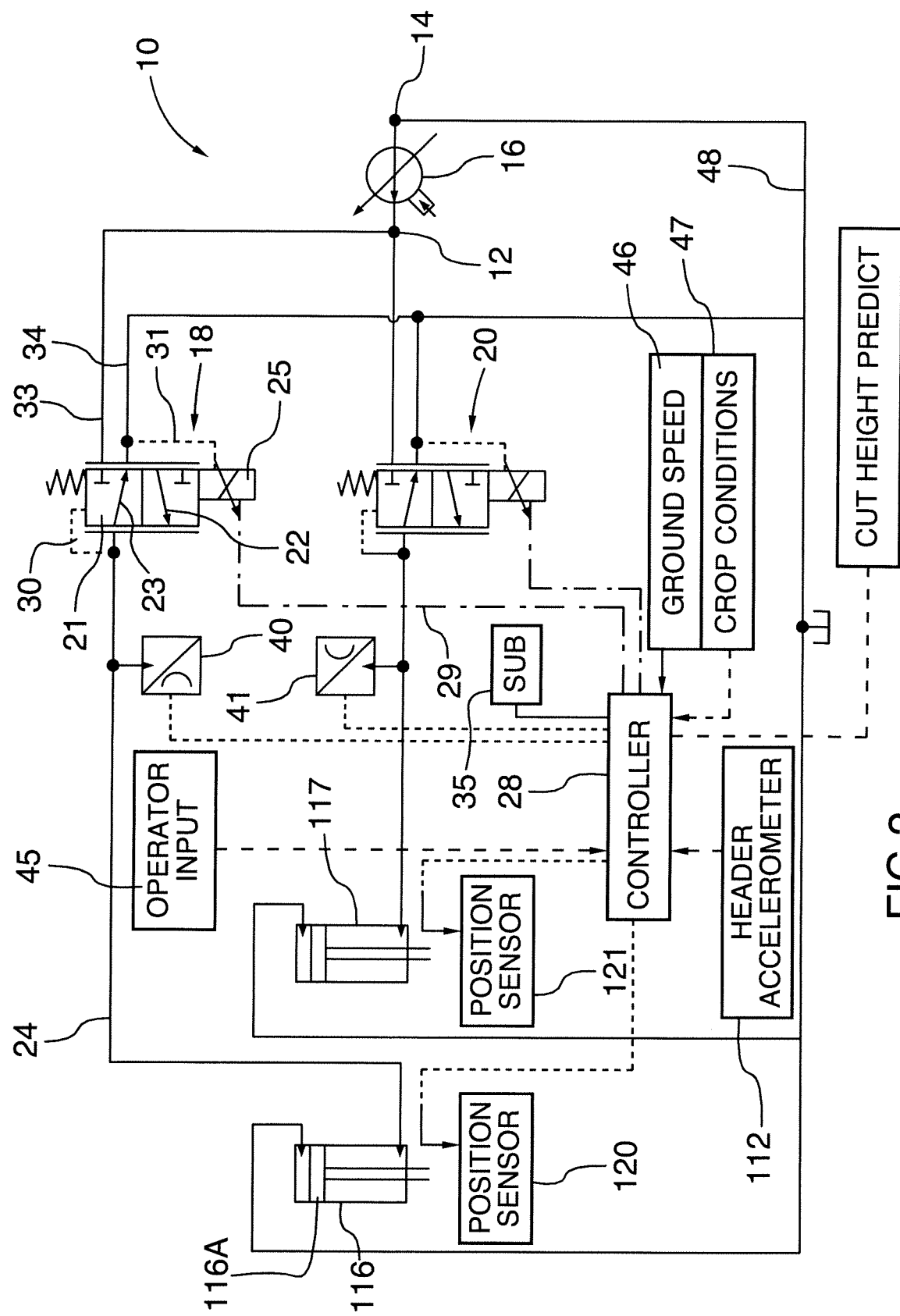
FIG. 2 is a schematic illustration of a simple arrangement of the control system according to the present invention for use in the header of FIG. 1.

The support apparatus shown in FIG. 2 includes at least one and typically two hydraulic float cylinders 116 and 117 arranged such that application of a hydraulic fluid under hydraulic pressure to the float cylinders 116 and 117 causes a lifting force to be applied to the crop harvesting header by movement of the float cylinder which lifting force is proportional to the hydraulic pressure applied to the cylinder.

The float cylinders include cylinder seals 116A over which the piston component slides relative to the cylinder component of the float cylinder. The circuit 10 applying pressure to the cylinders includes a source 12 of hydraulic fluid for supply of the hydraulic fluid to the float cylinder at a pressure greater than a required hydraulic pressure. The source 12 includes a pump 16 and a drain 14 providing a return for the hydraulic fluid.

The circuit includes two separate sections for supplying fluid under pressure to the respective cylinders 116 and 117, including for each a respective valve arrangement 18, 20 for controlling a flow of and pressure of the hydraulic pressure from the source to the respective cylinders.

As explained previously, the valves are of the PPRR type which include a spool 21 which can slide back and forth within the valve to connect inlet and outlet ports 22, 23 to the line 24 to the respective cylinder. The spool is driven by a solenoid 25 so as to position the solenoid at a required location to generate a required pressure depending upon a signal to the solenoid provided by a controller 28 on a control line 29. The spool is also controlled by pilot pressure on line 30 and 31 connected respectively to the inlet and outlet to the valve. Such valves are commercially available from many different suppliers and are known as proportional pressure reducing/relieving valves. These act to maintain the pressure within the cylinder as it supplied along the line 24 at a predetermined value set by the signal on the line 29 from the control system by repeatedly supplying and discharging fluid relative to the cylinder through the ports 22 and 23.

The control signal to the valves is the generated and controlled by and electronic control system in order to change the predetermined pressure in the respective cylinder in dependence on a value of the applied signal.

Thus the valve arrangement includes a first connection 33 to the source 12 and a second connection 34 to the return together with the outlet 24 to the cylinder.

The valve component operates to control flow of hydraulic fluid from the source to the float cylinder and flow of hydraulic fluid from the float cylinder to the return so as to maintain the hydraulic pressure in the float cylinder at a predetermined pressure set in dependence upon the control signal from the control system. The control system 28 includes a subcomponent 35 which acts to generate an alternating wave signal so as to provide an arrangement for causing relative reciprocating movement in an alternating wave pattern between the piston component of the float cylinder and the cylinder component of the float cylinder so as to maintain movement between the components at the cylinder seals 122 to reduce the effect of static friction.

That is the relative reciprocating movement is provided by the alternating wave pattern signal applied by the electronic control system to the valve arrangement to change the predetermined pressure in dependence on a value of the alternating wave signal.

The subcomponent 35 is controlled by the control system 28 so that the alternating wave pattern is applied only when the cylinder is in float mode and not when the cylinder is used in a lifting or lowering state.

The circuit further includes pressure sensors 40 and 41 which detect the pressure in the fluid supply lines to the cylinders to provide a signal which is communicated to the control system 28. As the valves are arranged to provide the pressure output in response to the control signal supplied, the measurement of the pressure output is not theoretically required. However in view of temperature and other changes which may occur, it is desirable to check the output pressure to ensure that it does not drift over time and the is maintained at the required pressure as determined by the control signal. The feedback check provided by the pressure sensors can be carried out periodically and is not part of the control system operation to generate the output signals.

The position sensors 120 and 121 which detect the position of the cylinders provide a signal which is supplied back to the control system 28. The system may run using only input from the position sensors since the control system 28 can calculate from changes in the signal from the position sensors both the velocity and acceleration of the cylinder and therefore of the header. A suitable algorithm to make such calculations is of course well-known to persons skilled in this art. However in addition to the position sensors or as an alternative thereto, the system may include an accelerometer 42 mounted on the header at one or more suitable locations to provide an output indicative of relative movement of the header and acceleration of the header.

The circuit can further include an operator input 45 which allows the operator to input various parameters as necessary for controlling the control system 28. The control system also includes input lines responsive to various parameters of the operating header including for example a ground speed indicator 46 and a crop condition indicator 47. These are shown only schematically as persons skilled in the art can determine suitable input parameters. A further input line can be provided from a prediction system 48 which can use ground height and crop height sensors to detect in advance and the intended height of the cutting action. The signal can be used to predict obstacles or required changes in cutting height so that the control system can generate suitable signals to raise or lower the cylinders 116, 117 to a required position.

The electronic control system is arranged to provide dynamic control of the lift force applied by the cylinders to the header. Thus, in response to any movement of the header detected by the position sensors or by other accelerometer and relative movement type sensors, the control system can change the pressure applied to the cylinders by the control valves so as to increase or decrease the lifting force from the preset float condition to change the movement of the header.

In this way, for example, upon detection of acceleration in the upward floating movement the control system can act to change the control signal to increase the lifting force to assist the acceleration in the upward floating movement.

Furthermore the electronic control system can act upon detection of an end of the upward acceleration in the upward floating movement to change the control signal to decrease the lifting force to dampen the upward movement.

These two dynamic actions can be used for example on impacting an obstacle or on rapid rise in the ground level to rapidly accelerate the header upwardly to clear the ground and then to halt the upward movement by a damping action to cause the header to float back downwardly as quickly as possible. To force the header downwardly more quickly, the electronic control system can act to change the control signal to decrease the lifting force to a value less than the set float value.

Symmetrically, the electronic control system can act upon detection of acceleration in the downward floating movement to change the control signal to decrease the lifting force to assist the acceleration in the downward floating movement and upon detection of an end of the acceleration in the downward floating movement to change the control signal to increase the lifting force to dampen the downward movement.

Figure 3:
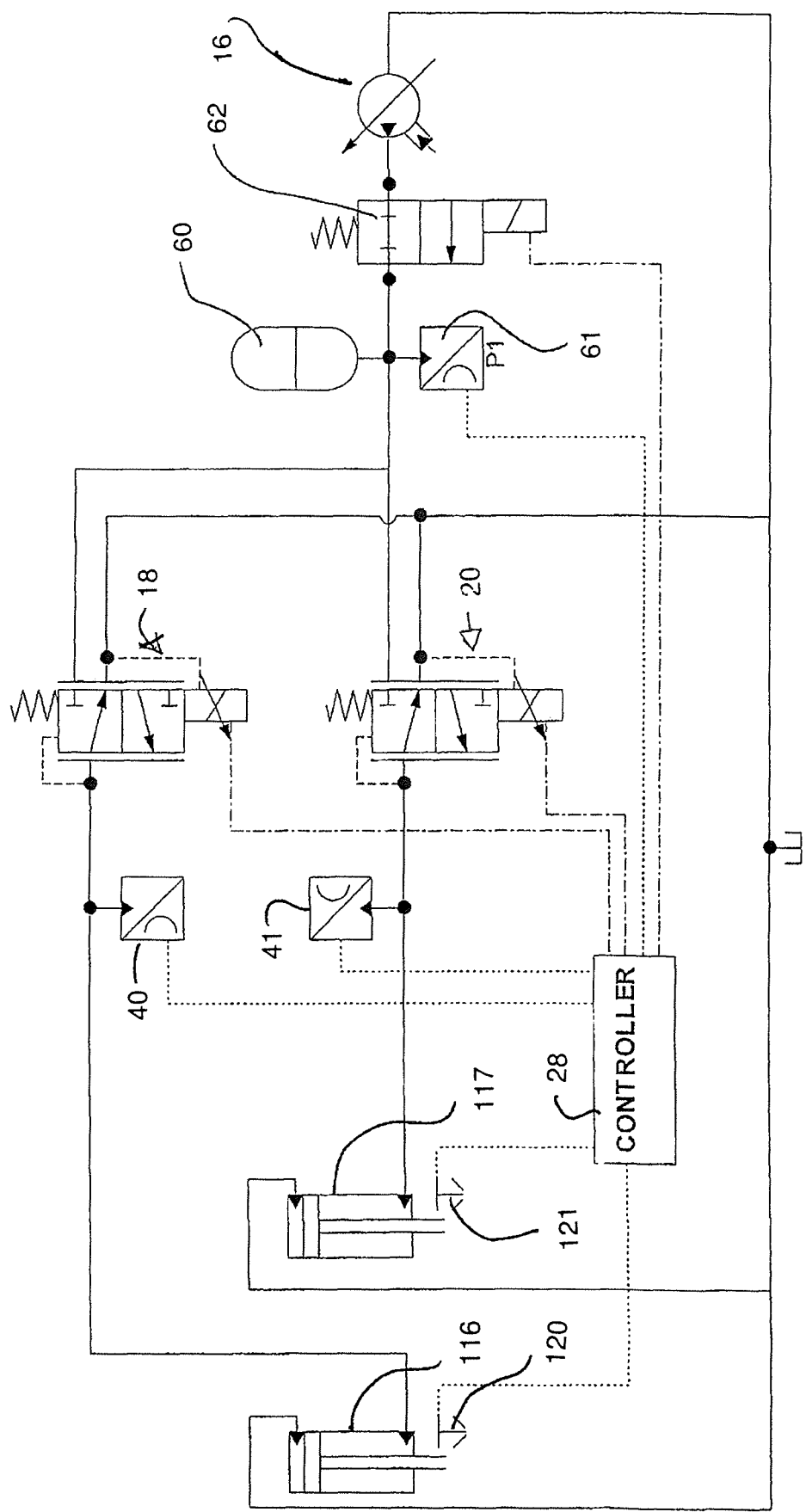
FIG. 3 is a schematic illustration of a second arrangement of the control system according to the present invention for use in the header of FIG. 1 which includes an accumulator as a part of the fluid source to ensure sufficient and immediate fluid flow to satisfy the PPRR valves.

In FIG. 3 is shown an arrangement in which there is provided on additional accumulator 60 which has a pressure sensor 61 and a supply valve 62. This accumulator can be used to provide or to ensure sufficient fluid flow to the inlet of the valves 18 and 20 to meet the requirements for rapid flow of fluid into the cylinders if required. In this way, if the pressure source 16 which comprises a pump has insufficient flow rate at startup, the flow can be provided by the accumulator.

Figure 4:
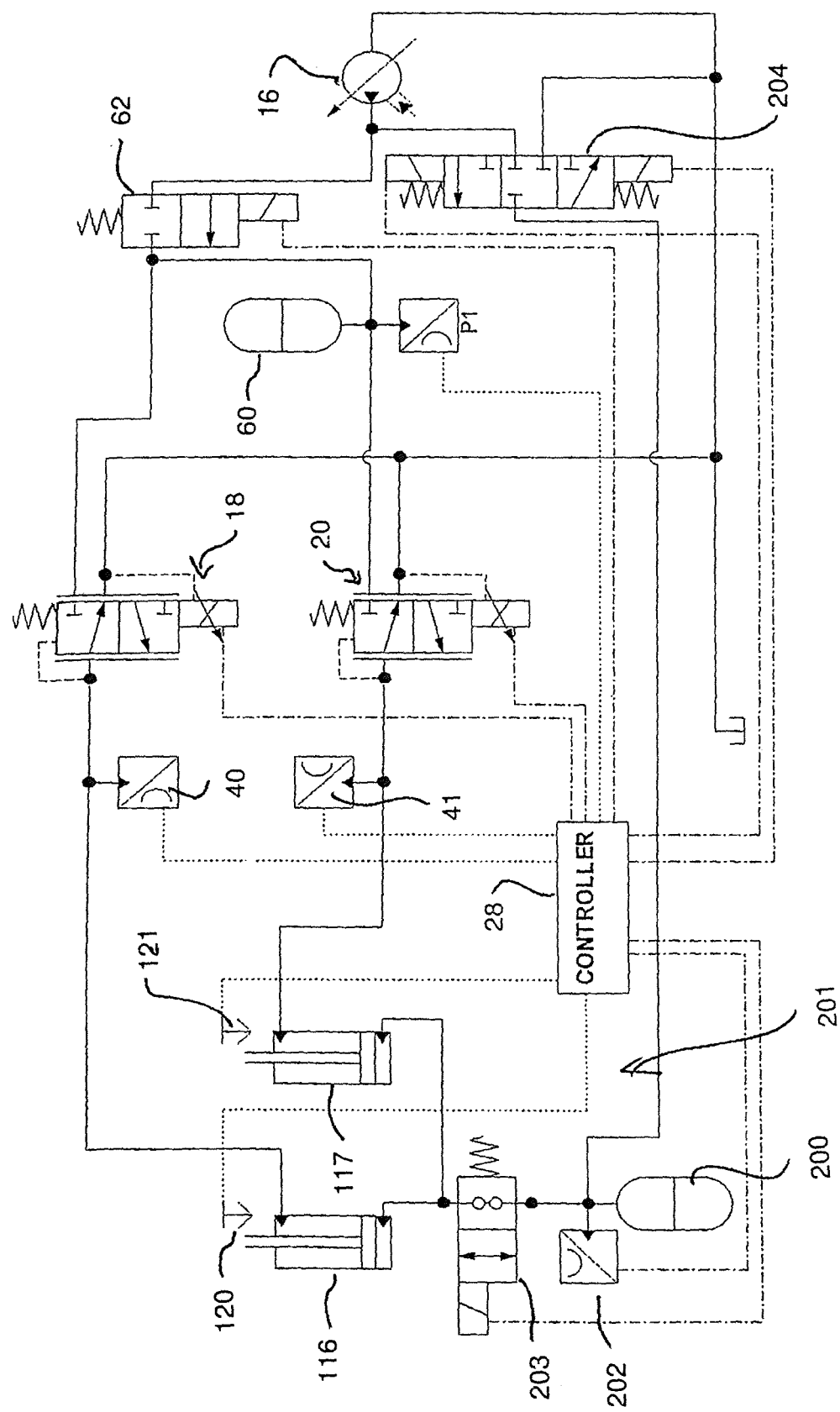
FIG. 4 is a schematic illustration of a third arrangement of the control system according to the present invention for use in the header of FIG. 1 arranged to capture energy of header floating.
Figure 5:
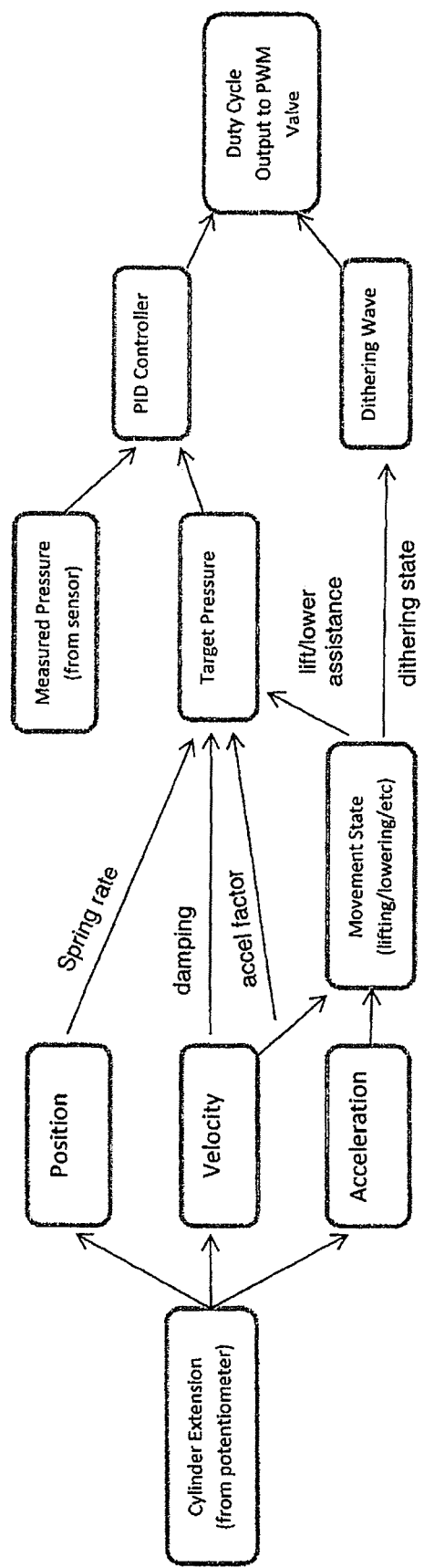
FIG. 5 is a flowchart showing the operation of the system.

In FIG. 4 is shown on optional hydraulic schematic to capture energy of header floating can also be used.

In this version of the invention, the cylinders 116 and 117 are inverted relative to that shown in FIGS. 2 and 3. Also the pressure supplied to the cylinders from the valves 18 and 20 is opposed by pressure from a supply 201 including an accumulator 200 at a constant pressure so that lift force is generated by a difference in pressure from the valves 18 and 20 relative to that of the supply 201. In other words, the lifting action is provided by the pressure from the source 201 and this is opposed by the pressure supplied by the valves 18 and 20 to decrease the lifting force to a value determined by the valves 18, 20 under control of the control system 28. In order therefore to increase the lifting force, the pressure in the cylinders supplied by the valves 18, 20 is reduced, and vice versa.

That is there is an additional accumulator 200 that supplies float energy to the float cylinders that is above what is normally required to float the header. The PPRR valves 18, 20 are controlled to add down force to the cylinders 116, 117 to make the header float down to the ground. The control system for the PPRR valves is similar to the arrangement described above but with this system, the flow and/or pressure required to adjust the float are lower.

Also with this system, the system is capturing the energy from the header floating down, into the accumulator 200 using an intervening shut-off valve 203. A pressure sensor 202 and control valve 204 are used in conjunction with the controller 28 to control the pressure in this accumulator system.

As set forth above, this is maintained at a constant value, which can be set at different values depending on various operating parameters, and the variations in the lifting force are applied by the valves 18, 20 on the upper side of the piston to apply a variation in the pressure opposing the constant upward force on the lower side of the piston.

Thus the float cylinders can be used in either orientation, and are shown inverted in this embodiment. It can be appreciated that the float cylinders could be used in a pull configuration rather than a push configuration as well. In all FIGS. 2, 3 and 4, the header weight is in the downward direction. That is the variations in the pressure supplied by the valves can be used in a number of different orientations to change the lift force generated by the cylinders.

The sensors to collect information about the dynamic state of the implement can include a linear potentiometer which measures the extension of the hydraulic cylinder and a pressure transducer providing feedback of the supplied pressure. In other interpretations, the force transmitted to the implement through the hydraulic cylinder could be monitored with a force transducer or the height of the implement from the ground could be measured either directly or indirectly.

In addition, instead of calculating velocity and acceleration from the position sensor, movement sensors and accelerometers can be used to provide direct signals proportional to these values.

The arrangement could be used to achieve a comprehensively adjustable spring rate for the dynamics of the flotation system of the implement The arrangement could be used to achieve comprehensively adjustable damping for the dynamics of the flotation system of the implement The arrangement could be used to achieve comprehensively adjustable flotation system dynamics based on operating state of the implement including but not limited to implement height, ground speed and changes in terrain (incline angle, etc)

The arrangement could allow for the operator to select from pre-set flotation system dynamics which can be tailored to different field conditions and implements.

While existing float systems can achieve acceptable ground forces when the header is stationary, because the applied force is generally independent of the header's state of motion, the header will still dynamically respond based on its mass, not the set point of the float system. For example, the float system could be set such that the ground force is 500 lbs, however, in order for the header to accelerate upwards or downwards, an additional input of force is required. Based on Newton's second law (F=ma), this additional force will generate an acceleration in the header which is inversely proportional to the header's mass. Therefore, while the header may be statically light (i.e., light when it is stationary), in order for it to actually move up and down to follow the ground, its dynamics will still be governed by its mass and higher ground forces will be required to actually lift the header. An implication of this arrangement is that the lower the static ground force is set, the slower the header is able to fall. This is because the maximum input force into the float system to make the header fall is equal to the floated weight of the header. Therefore, the smaller the floated weight of the header, the smaller the resulting acceleration. The existence of friction within the system will also factor into how light the float system is able to be. Friction creates an asymmetry between the required ground force when lifting and lowering the header. This leads to higher ground force when lifting and slower movement when lowering. This also creates a limit to how light the static ground force can be set as the floated weight must be larger than the friction in the system in order for the header to actually be able to fall after being lifted.

The float system of the present invention allows these limitations to be reduced because the force applied by the float system can be controlled based on the header's state of motion. Based on the sensor feedback collected, the controller can actually add more force to the system when the header is being lifted in order to help it lift more quickly with less ground force. Additionally, when the header starts to fall, the controller can decrease the applied force so that it falls more quickly. By being able to adjust the force provided by the float system based on the header's state of motion, the dynamics of the header can be altered so that it is no longer governed solely by the mass of the header. This can allow a heavy header to not only have acceptable ground force when stationary, but also lift and lower as though it actually has less mass. This also circumvents the limitation that the minimum downwards acceleration is tied to the floated weight of the header, allowing the float system's stationary ground force to also be lower than could be achieved with a conventional float system.

It is desirable to provide mechanical improvements such as reduced system friction, a smaller dead band in the hydraulic valve and reducing hydraulic restriction for flow traveling into and out of the cylinder since these will reduce the amount of intervention required by the controller to produce favourable dynamics. Improving the quality of the feedback signals to reduce the effects of noise (both mechanical and electrical) provides the controller with more reliable data from which to make control decisions.

The intention of a float system is to reduce the ground force of a header in order to reduce wear and improve ground following capabilities. To date, all float systems are based on a static balance of the implement. In other words, a force is applied such that it lifts a portion of the header's weight so that the ground force is lower. Provided the header is not moving up or down throughout its float range, this system is effective at reducing ground force. For example, if a header weighs 7000 lbs and the float system is set to carry 6800 lbs, then only 200 lbs needs to be reacted by the ground. However, considering only the static state of the system neglects two important factors; friction and inertia.

In a friction-less system, the ground force is the same whether the header is being lifted or lowered (assuming this is done very slowly). However, when friction is introduced in the system, the ground force is no longer the same when lifting and lowering. In fact, the difference between the ground force when lifting and lowering is equal to twice the friction in the system. As a result of friction, there is a minimum ground force which can be achieved. If this minimum threshold is exceeded, the header will no longer fall under its own influence after it is lifted as the floated weight of the header is not sufficient to overcome friction. While minimizing the friction in the system can help to reduce this effect, it will still represent a limitation of the system.

Another important short-coming of basing a float system on the static balance of the header is that the dynamics of the header will still be governed by the header's weight when it is in motion. Based on Newton's second law:

$$a_{header} = \frac{F_{float} + F_{ground}}{m_{header}} - g$$

Thus a 7000 lbs header (with no friction), set to 200 lbs static ground force can only achieve a maximum downwards acceleration of 0.03 g. It also requires 900 lbs of ground force to accelerate the header upwards at 0.1 g. While the static ground force can be set reasonably light, the lighter this becomes, the slower the header is capable of falling after being lifted. Also, the slope of the line (and consequently the ground force required to produce a given acceleration) remains tied to the mass of the header, not to the set point of the float system. As a result of this limitation, the header will still respond dynamically like it is 7000 lbs; all the float system is able to change is the static ground force of the system. When the effect of friction is combined with this limitation, it is unsurprising that there are limitations to how light an existing float system can get before its ground following capabilities are compromised.

In order to try and improve the dynamic response of the float system, the float system needs to not only change the static ground force, but also how much ground force is required to lift and lower the header. The hydraulic float system described herein achieves this is by introducing feedback regarding the dynamic state of the system into the float control system. While a wide number of different measurements can be used to infer information regarding the dynamic state of the system (such as force, hydraulic pressure or other kinetic measurements), as described herein, the extension of the float cylinder is measured with a potentiometer and this signal can be differentiated numerically to determine the full kinematic state of the system.

In order to alter the dynamics of the header using the float system, the input force from the float system cannot remain constant, but instead must vary with respect to the dynamic state (velocity and acceleration) of the header. The goal of the control algorithm is to not only reduce the static ground force when the header is stationary, but also to reduce the amount of force required to lift the header and to allow the header to fall more quickly (as though it were a lighter header). Such a system allows for lower ground force as well as better ground following capabilities. A dynamically changing force applied by the float system can reduce the impact of friction within the system.

The target pressure calculated by the position, velocity and acceleration state of the cylinder is generated by using a simple PID controller. This PID intermittently looks at the difference between the target pressure and the measured pressure and then adjusts the output to try and minimize the error. The PID controller can be supplemented with an open-loop lookup table. The ability to robustly and reliably maintain the cylinder pressure at the target pressure facilitates the development of a responsive and stable cylinder response.

Dithering is superimposed on the output to the PWM valve in attempt to reduce the amount of hysteresis in the system. Dithering is the intentional addition of "noise" into the signal. In this setup, sinusoidal dithering waves were used. It should be noted that while the output of the controller can be sinusoidal, the achieved pressure fluctuation is not necessarily perfectly sinusoidal due to the ability of the hydraulics to replicate the input signal. This dithering signal was calculated and simply added to the output of the PID controller to obtain the total output to the valve.

There are three parameters which can be controlled to change the nature of the dithering; the wave's amplitude, period and shape (sinusoidal, square, triangular, etc.). A variety of different parameters can be used to try and reduce hysteresis and improve the response of the system.

Relatively effective dithering can be achieved with a dithering wave period of only 80-100 msec and an amplitude of only no of the overall operable PWM duty cycle range although both a longer period and higher amplitude dithering wave can be necessary to achieve a similar result.

The period of the dithering wave appears to be bounded on the low end by the responsiveness of the PRR valve as well as the ability to deliver the flow required to move the cylinder. Above this lower limit, the effect of the dithering wave is more directly related to the power input of each half waveform. Consequently, a higher amplitude waveform is necessary at shorter dithering periods, while a lower amplitude waveform can be used with a longer dithering wave period. By maintaining a dithering magnitude of 7% and varying the dithering period at short dithering periods of <150 msec were not particularly effective. Dithering periods of 200-250 msec are effective, whereas if the dithering period is increased further, the header can noticeably shake. This shaking could be reduced by lowering the amplitude of the waveform so that the power of each half waveform is lower. However, it is best to keep the dithering period as low as possible in order to help improve the reaction time of the system, so the shortest dithering period which is effective should be selected.

Any required motion will only be aided by half of the dithering waveform and hindered by the other half of it. It is helpful to interpret the dithering wave as the controller consecutively checking to see if the header wants to lift, and then checking if it wants to lower. The amount of power in the dithering half-wave required to perform these checks will relate to both the friction in the system as well as the responsiveness of the hydraulics. It is helpful to disable dithering when in a lifting or lowering state as half of the dithering wave will be acting against the intended motion.

Pressure, position, velocity and acceleration inputs into the control structure are calculated as follows. As discussed previously, the cylinder is kept in constant motion by having the pressure in the cylinder always varying slightly by having a sinusoidal wave applied to the valve output (referred to as dithering). This can make it more difficult to determine the pressure and position of the cylinder as this adds a substantial amount of noise. As a result, filtering and averaging techniques are used to try and distinguish the bulk movement of the system while ignoring the motion caused by dithering. These techniques can retain more responsiveness by using the properties of the dithering wave instead of simply filtering more aggressively.

Since dithering creates variation in both the pressure in the cylinder as well as the position, both of these values are averaged over a single dithering wave period in order to try and reduce the influence that dithering has on their calculation. A shorter dithering period is therefore desirable to help improve responsiveness of this calculation.

Since the velocity and acceleration terms are based on a difference calculation, these are performed differently than the position and pressure terms; instead of looking at only a single dithering period, these calculations look at the last two dithering periods. The position (or velocity) is then compared at equivalent locations within the dithering wave. This allows for the calculation to be sensitive to changes in position which are lower in magnitude than those created by the dithering wave. Again, the calculation is averaged over a single dithering period. The velocity is calculated by looking at how much the position has changed between comparable locations in the dithering waveform. In order for a hydraulic float system to produce adequate ground following capabilities, it is desirable for it to mimic the response of a spring. In order to simulate a spring-like effect, the extension of the cylinder is used to vary the cylinder pressure. In this setup, a simple linear spring rate was added. The spring rate is introduced by creating a linear function which determines the target pressure based on the measured cylinder extension. This made the required input force get higher as the wing was lifted higher. The below equation shows the most recent spring rate used to alter the header's dynamics:

$$P_{target} = P[psi] - \left(0.26\left[\frac{psi}{mm}\right] * y[mm]\right)$$

Based on the current spring-based system, it is believed that having the header get heavier as it gets lifted is beneficial. This has the effect of biasing the header so that it naturally wants to fall. However, provided that the target pressure at a given height leads to a non-zero ground force, the header should always want to fall. If terrain leads to extended periods of time spent with the header either raised or lowered, these periods of time occur with ground force which is either lighter or heavier than the set point. Provided the spring rate is not set particularly aggressively, this is likely not an issue, however, there may be value to having a more even header response throughout its range of motion to avoid it either being too light and wanting to lift off when too heavy and inclined to push when too light.

In one arrangement, the header's set point pressure can follow around a moving average of the header's position. This is an effective way to implement a spring rate without sacrificing header pressure performance when spending extended periods of time away from its normal position. Such an arrangement makes the header initially want to return to its last position (by either getting heavier when lifted or lighter when lowered), but have it adapt to a change in position if it is maintained for a period of time.

In addition to having the dynamics of the header change with respect to the header's position through the use of a spring rate, the header's potentiometer signal is also used to change the target pressure with respect to velocity and acceleration. As described previously, both the velocity and acceleration terms were calculated in a way as to try and minimize the detection of movement caused by dithering so as to only focus on the header's bulk movement The velocity term relates to the damping of the system. However, since the header already had an over-damped response, this term is used to try and reduce the damping of the system by reinforcing the motion of the header. This term has some similarities to lift and lower assist pressures except instead of adding a constant pressure to the target, the effect varies with the magnitude of the header's velocity. It should be noted that this term would have the effect of tending to de-stabilize the header. It is helpful to create a nonlinear velocity-based function which restricts smaller velocities and reinforces larger velocities. It would also likely be beneficial to make this term saturate at a maximum value to ensure this effect does not reduce the require ground force to lift the header below zero (which would cause the header to continue to accelerate upwards until it reached full raise.

$$P_{target} = P[psi] + \left(6.0\left[\frac{psi}{mm/s}\right] * \dot{y}\left[\frac{mm}{s}\right]\right)$$

The acceleration term relates to the inertia of the system. By reinforcing accelerations, the controller is able to reduce the effective inertia of the header to help it to react to input forces as though it weighed less. However, in practice, taking a numerical second derivative of a sensor input is inherently noisy, so the ability to implement this is limited.

That said, there is still value to incorporating a term which ties target pressure directly to the acceleration of the header to some extent. While initially a single constant is used, this term can be split into two parameters; one to control the impact of positive accelerations and one to control the impact of negative accelerations.

$$P_{target} = P[psi] - \left(0.4\left[\frac{psi}{mm/s^2}\right] * \ddot{y}\left[\frac{mm}{s^2}\right]\right) \text{ for } \ddot{y} \geq 0$$

$$P_{target} = P[psi] + \left(0.06\left[\frac{psi}{mm/s^2}\right] * \ddot{y}\left[\frac{mm}{s^2}\right]\right) \text{ for } \ddot{y} < 0$$

Positive accelerations relate to when ground force is increased and the header starts to lift, or when the header impacts the ground after falling. In order to help the header stick after it lands on the ground, positive accelerations were used to decrease the target pressure of the controller somewhat. This makes the header heavier momentarily when it contacts the ground to help stop it from bouncing up again. This does also have the effect of make the header somewhat heavier when you first try to lift it. However, since the acceleration of the header impacting the ground is notably larger than the acceleration input when lifting the header, the effect is more noticeable in the case of an impact.

Negative accelerations relate to when the header slows down while lifting and begins to fall. In order to help stop the header from hanging up, negative accelerations are also used to decrease the target pressure of the header, making it momentarily heavier and therefore less likely to hang up. If you begin to slow down the rate at which you lift the header, it starts to get heavier.

It is possible to develop nonlinear equations which use the position, velocity and acceleration states of motion (as well as other variables such as ground speed, cut height, etc.) to extensively customize the dynamic response of the system.

Translating the control structure's target pressure into the output float force of the system quickly, and accurately is important for optimizing the system response. While the closed loop PID structure is quite effective at replicating the target pressure, more advanced control techniques can help to further improve this response. The inclusion of an open loop lookup table and downgrading the PID controller to a correction factor can be used. It is possible to reduce the impact of valve lag by providing momentary overshoots in the current output to the solenoid to help it change directions more quickly.

Reliably and robustly measuring the position, velocity and acceleration of the cylinder is required for responsively controlling the float dynamics without introducing instability. It is desirable that these calculations provide a clean signal with as little lag as possible. In the current configuration, all calculations are tied to the dithering period, regardless of whether dithering is actually active. It may be beneficial to move towards two distinct calculations; one when dithering is active and one when it is not. This may help to allow for higher responsiveness is situations where noise caused by dithering does not need to be accounted for.

The hydraulic float system described herein provides a float system which is more responsive, with improved ground following capabilities and a lower ground force. The system is based on using an electronic controller and feedback from sensors in order to decide what pressure should be supplied to the hydraulic float cylinder. This pressure is then supplied by using a proportional pressure reducing/relieving valve based on the output signal from the controller. The resultant system allows for a highly customizable hydraulic pressure (and consequently force) provided by the float system. This allows for the float system to adjust the force provided by the float system in order to reduce the effects of friction in the system as well as to fundamentally alter the dynamics of how the header moves.

As shown therefore in FIG. 6, there is provided a crop harvesting machine comprising a self-propelled support vehicle 102 for running over ground carrying a crop to be harvested.

The crop cutting header includes at least one ground engaging component such as cutter bar 89 for providing a supporting force from the ground as it runs over the ground. A support apparatus including the links 96, the spring 95 and the cylinder 94 provides a variable spring lifting force for supporting the header from the vehicle for upward and downward floating movement of the header.

A control system 88 is arranged to provide a value of the lifting force applied by the spring to the header so that a predetermined proportion of a supporting force on the header is supplied by the spring and a remaining portion is supplied by the cutter bar 89 in engagement with the ground.

The control system includes a control algorithm which operates in response to a ground speed signal from a sensor 87 to temporarily change the lifting force.

The crop cutting header is of the type which comprises a rotary mower having a plurality of transversely spaced cutting disks 91 on the cutter bar 90 as is conventionally known. However other headers can be used with this same system.

The control system 88 is arranged by the algorithm in the software such that the lifting force provided by the spring 95 is reduced by the cylinder 94 to reduce the lifting force provided by the spring and thus to increase the weight of the header on the ground when the ground speed is higher.

The lifting force provided by the spring is reduced to increase the weight of the header on the ground when the ground speed is greater than 5 mph as indicated by the sensor 87. The lifting force is reduced to increase the weight of the header on the ground proportional to ground speed as controlled by the algorithm of the control system 88 in response to the signal from the sensor 88. The algorithm is arranged after the temporary increase generated by the increase in ground speed to reduce the lifting force to revert back to a set value suitable for the lower speed of around 5 mph. Alternatively as the speed reduces as detected by the sensor 88, the lifting forces is reduced by a value directly or indirectly proportional to the ground speed.

Also the control system is arranged to temporarily vary the lifting force in response to detected movement of the header relative to the vehicle as provided by the sensors previously described herein and indicated schematically in FIG. 6 at 86. As described previously the control system can arranged to temporarily vary the lifting force in response to detected acceleration of the header relative to the vehicle and upon detection of an end of said acceleration to again vary the lifting force.

That is there is provided a position sensor 86 for generating a position signal indicative of a position of the header in the movement and the control system is arranged to calculate from the position signal a velocity and acceleration of the header.

As described previously the algorithm of the control system can be arranged to provide a plurality of preset flotation weights for different ground speeds.

The invention claimed is:

1. A crop harvesting machine comprising:
a self-propelled support vehicle for running over ground carrying a crop to be harvested;
a crop cutting header including at least one ground engaging component for providing a supporting force from the ground as the header runs over the ground;
a support apparatus providing a lifting force for supporting the header from the vehicle for upward and downward floating movement of the header;
a control system configured to provide a value of the lifting force so that a predetermined proportion of a supporting force is supplied by the support apparatus and a remaining portion is supplied by the at least one ground engaging component in engagement with the ground;
a ground speed sensor for providing a ground speed signal to the control system indicative of a ground speed of the header;
the control system being configured to 1) temporarily vary the lifting force in response to detected acceleration of the header relative to the vehicle, 2) decrease the lifting force upon detection of an end of the acceleration in an upward floating movement of the header, and 3) temporarily change the value of the lifting force in response to the ground speed signal.

2. The crop harvesting machine according to claim 1 wherein the crop cutting header comprises a rotary mower having a plurality of transversely spaced cutting disks.

3. The crop harvesting machine according to claim 1 wherein the control system is arranged such that the lifting force is reduced to increase a weight of the header on the ground when the ground speed is increased.

4. The crop harvesting machine according to claim 1 wherein the control system is arranged such that the lifting force is reduced to increase a weight of the header on the ground when the ground speed is greater than 5 mph.

5. The crop harvesting machine according to claim 1 wherein the control system is arranged such that the value of the lifting force is reduced to increase a weight of the header on the ground where the value is proportional to ground speed.

6. The crop harvesting machine according to claim 1 wherein the control system is arranged such that the value of the lifting force is reduced to increase a weight of the header on the ground in response to an algorithm dependent on the ground speed.

7. The crop harvesting machine according to claim 1 wherein the control system is configured to, after reducing the value of the lifting force, to revert to a set value.

8. The crop harvesting machine according to claim 1 wherein the control system is configured to temporarily vary the value of the lifting force in response to detected movement of the header relative to the vehicle.

9. The crop harvesting machine according to claim 1 wherein the control system is configured to temporarily vary the value of the lifting force in response to detected acceleration of the header relative to the vehicle.

10. The crop harvesting machine according to claim 9 wherein the control system is configured to, upon detection of an end of said detected acceleration, to vary the value of the lifting force.

11. The crop harvesting machine according to claim 1 wherein there is provided a position sensor for generating a position signal indicative of a position of the header during the upward or downward floating movement and wherein the control system is configured to calculate from the position signal a velocity and/or acceleration of the header.

12. The crop harvesting machine according to claim 1 wherein the control system is configured to provide a plurality of preset values of lifting force each associated with a respective one of a plurality of different ground speeds.

13. The crop harvesting machine according to claim 1 wherein the support apparatus comprises a mechanical spring and wherein the control system is configured to vary a spring force of the mechanical spring.

14. A rotary mower comprising:
a self-propelled support vehicle for running over ground carrying a crop to be harvested;
a crop cutting header having a plurality of transversely spaced cutting disks and at least one ground engaging component for providing a supporting force from the ground as the header runs over the ground;
a support apparatus providing a lifting force for supporting the header from the vehicle for upward and downward floating movement of the header;
a control system configured to provide a value of the lifting force so that a predetermined proportion of a supporting force is supplied by the support apparatus and a remaining portion is supplied by the at least one ground engaging component in engagement with the ground;
a sensor providing ground speed signals indicative of different ground speeds of the vehicle;
the control system being configured to 1) temporarily vary the lifting force in response to detected acceleration of the header relative to the vehicle, 2) decrease the lifting force upon detection of an end of the acceleration in an upward floating movement of the header, and 3) control the value of the lifting force such that the lifting force has a first value at a first ground speed and a second value at a second ground speed higher than the first ground speed where the second value of the lifting force at the second higher ground speed is less than the first value of the lifting force at the first ground speed.

15. The crop harvesting machine according to claim 14 wherein the control system is configured such that the lifting force is reduced to the second value when the ground speed exceeds a predetermined value.

16. The crop harvesting machine according to claim 14 wherein the control system is configured such that the value of the lifting force is inversely proportional to the ground speed.

17. The crop harvesting machine according to claim 14 wherein the control system is configured such that the value of the lifting force is related to the ground speed by an algorithm dependent on ground speed.

18. The crop harvesting machine according claim 14 wherein the control system is configured to, after reducing the value of the lifting force, to revert to a set value.

19. The crop harvesting machine according to claim 14 wherein the control system is configured to provide a plurality of preset values of lifting force each associated with a respective one of a plurality of different ground speeds.

* * * * *